United States Patent [19]
Doll, Jr. et al.

[11] Patent Number: 5,127,003
[45] Date of Patent: Jun. 30, 1992

[54] DIGITAL/AUDIO INTERACTIVE COMMUNICATION NETWORK

[75] Inventors: William J. Doll, Jr., San Diego; Murray S. Judy, Carlsbad, both of Calif.; Albert H. Kirchner, III, Great Falls, Va.; Thomas J. Krier, San Diego; Meldon L. Pettitt, Poway; Danny R. Reiswig, San Diego; Alan Watchorn, Encinitas; John C. Wirfel, San Diego, all of Calif.

[73] Assignee: Simpact Associates, Inc., San Diego, Calif.

[21] Appl. No.: 655,107

[22] Filed: Feb. 11, 1991

[51] Int. Cl.⁵ .............................................. H04J 3/02
[52] U.S. Cl. .................................. 370/110.1; 370/94.2
[58] Field of Search ............... 370/94.2, 110.1, 85.1, 370/94.1; 379/68, 88, 85, 74

[56] References Cited

U.S. PATENT DOCUMENTS

| | | | |
|---|---|---|---|
| 4,635,253 | 1/1987 | Urui et al. | 370/67 |
| 4,981,371 | 1/1991 | Gurak et al. | 370/110.1 |
| 5,067,125 | 11/1991 | Tsuchida | 370/110.1 |

Primary Examiner—Douglas W. Olms
Assistant Examiner—Min Jung
Attorney, Agent, or Firm—Gregory Garmong

[57] ABSTRACT

A communication system includes a digital network and an audio network such as a telephone system. The digital network includes a digital network server that communicates with client work stations in the digital network, and the telephone system includes a telephone system server that communicates with the telephones in the telephone system. Either the digital network or the telephone network server includes a memory that stores digital representations of voice objects received from the telephone handset. The digital network server includes a digital network server instruction set that operates the telephone system server to associate stored audio information received over the audio network with digital information of the digital network.

19 Claims, 3 Drawing Sheets

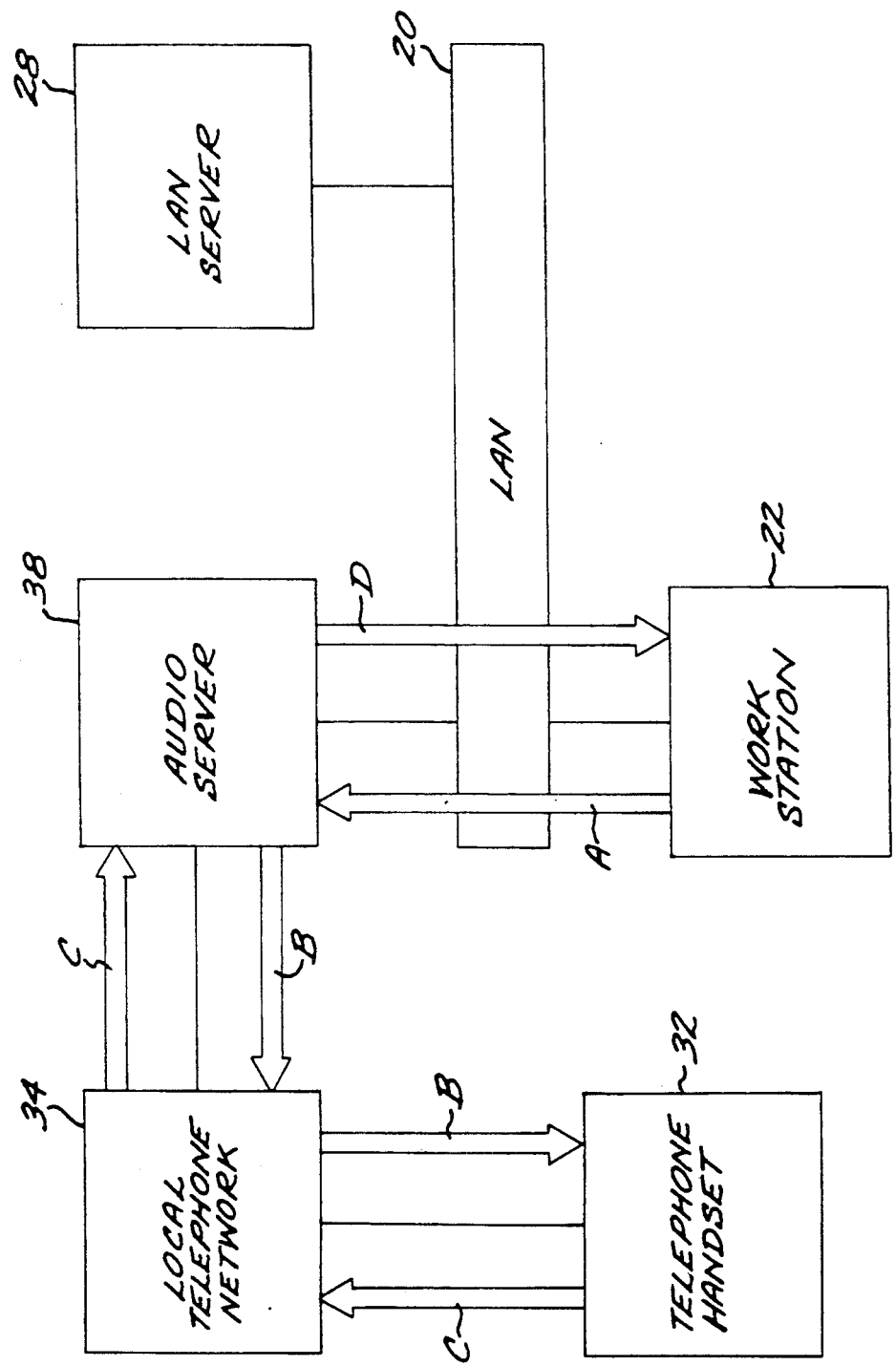

DIGITAL/AUDIO INTERACTIVE COMMUNICATION NETWORK

BACKGROUND OF THE INVENTION

This invention relates to communication networks, and, more particularly, to a communication network in which digital information such as documents and audio information are integrated.

With the advent of lower cost, faster, and more sophisticated computers, the mechanisms for communication of information between human beings and computing systems continues to improve. Word processors permit the text of documents to be created and modified, either locally or in conjunction with networks of users. Electronic mail allows messages to be left in electronic "mailboxes" for later reading. Voice mail performs a similar function for voice messages, permitting them to be left in voice mailboxes for later review.

These systems, however, have not addressed and improved some of the most important and commonly used modes of communication between persons. In many instances, for example, a text document is created by one person on a word processor, and distributed to others for discussion and review. When the reviewers are together in a single place, they typically provide their comments verbally, there is discussion, and finally the document is annotated or revised. There is an opportunity to orally exchange and discuss viewpoints before the document is modified.

When the reviewers are working alone, they each typically make their comments in writing, either on the margin of a hard copy document or in a separate portion of the document if it is circulated electronically on a network. These written comments may be made available for consideration by the other reviewers. There is, however, no opportunity for each reviewer to present views orally.

The absence of effective oral communication in some instances can have an important adverse effect on the final document. Many persons can interact better and be more persuasive orally than in writing. Oral communication carries voice tones, volumes, inflections, and emphases that convey information in addition to that conveyed by the written transcription of the spoken words. When the documents are circulated through an electronic network and the only way to make comments is through typed input, those who do not type well are seriously hampered. Such persons may give up on their attempt to present their points, with the result that important views may never be considered by the author and the other reviewers.

Advances in technology have provided some aid for those who prefer oral communication. Speech synthesis capability that creates audible speech from digital signals is available. There is progress on the inverse problem, speech recognition, but effective speech recognition systems require considerable improvement before they become widely used. There are programs that run on a single, local computer, such as some versions of IBM ® Displaywrite ® computer software, that permit audio comments to be inserted into word processor documents. The available programs are not readily adapted to network applications, because the hardware that records and plays back digitized speech is often not compatible among the various types of computer work stations connected to the network.

There is a need for a networked communication system that permits a number of persons to interact with both digitally stored information such as written text and audio information such as speech, without communicating simultaneously. The present invention fulfills this need, and further provides related advantages.

SUMMARY OF THE INVENTION

The present invention provides a communication network for creating, storing, recalling, and revising compound documents containing text, data, audio, and/or visual information in image or graphical form, and manipulating the electronic representations of these compound documents. The communication network of the invention integrates otherwise-independent digital and audio communications networks. In one common mode of usage, it permits a user to make voice or other audio comments and insertions, using an available telephone, at a specific location in a compound document maintained in a digital network and viewed on a work station terminal. Another user later reviewing the compound document at a work station can listen to the audio comments at the appropriate location in the compound document using that person's desk telephone, and add more oral comments. Audio portions of compound documents are heard with their orginal measure of tone, inflection, emphasis, volume and the like, not through mechanized speech.

A key feature of the system is that no physical modifications to the users' work station or telephone handsets are required, nor must the work stations have the same hardware and software, beyond being operable on the digital network. Hardware and software modifications can be made at a central location of each network, an important consideration because installation of the basic system and improvements can be made without requiring physical access to the users' work stations and telephones. The combination of digital and audio communication between work stations is implemented and integrated as long as the work stations are operable on a digital network, without regard to hardware and software differences that would otherwise prevent integration of combined digital and audio communication.

In accordance with the invention, a communication system operates with, and includes, digital network means for communicating digital information throughout a digital network, the digital network means including at least one, and usually at least several, work stations at which a human being can gain access to the digital network. The system also includes audio communications network means for communicating audio information throughout an audio communications network, the audio communications network means including at least one audio input/output device at which a human being can provide acoustic audio information to, and receive acoustic audio information from, the audio communications network. In a preferred approach, the digital network includes a local area or wide area network using a central computer (or cooperative processing client server architecture) and work stations at the desks of users. The audio communications network includes a local area or wide area telephone system, having handsets available at the work stations.

The communications system also includes digital network server means within the digital network means for processing digital information in the digital network, the digital network server means being in communication with the work station(s) through the digital network and having digital data storage means therein for storing digital signals in the digital network server means. An audio communications network server means within the audio communications network means processes an electronic representation of audio information in the audio communications network, the audio communications network server means being in communication with the audio input/output device through the audio communications network. Audio data storage means for storing an electronic representation of audio information may be provided in either the digital network server means, the audio communications network server means, or both.

The digital network server means includes command means that controllably commands input/output operation of the audio communications network server means. The command means typically operates under the control of the system user, but may operate automatically. The digital network server means, including its command means, and the audio communications network server means, including both hardware and programmed instructions, allow the full integration of information on the two networks, which are otherwise independent of each other, under control of either the human user from the work station or any client computing system under human or automatic control.

An application of the present invention, implemented experimentally by the inventors in their office, aids in the understanding of its operation. A compound document is provided at a work station of the digital network, by typed input, scanned input, revision of a previously existing document, or other means. (As used herein, a "compound document" is one that includes two or more of the information elements: text, data, images, and audio.) The text, data, and images of the compound document are stored digitally in a local area network (LAN) server. Another LAN user can recall the compound document at the same or another work station, and modify the compound document (if authorized to do so) by indicating in the compound document the location of an information insertion. Typically, the information insertion is a voice object, which can include both voice and other audio information, and this voice object is communicated to the audio telephone network through the telephone handset adjacent the work station. The location of the voice object is indicated in the text of the compound document with an appropriate symbol, termed an "audio icon". (An advantage of annotating the text in this manner is the retention of its spatial format, with only the audio icon appearing within the text.) The voice object insertion is stored in the telephone network server, the work station client, or any other computing device connected to the network. The compound document can then be recalled at any of the LAN work stations and its text, data, or image portions displayed on the work station screen. At appropriate points in the body of the compound document, where the audio icon appears, the voice insertion is controllably replayed over the handset of the telephone network at the work station.

The implementation just described uses one or more voice insertions to annotate, organize, or modify a compound document. In another application of the present invention, the text of a document can be used to annotate, organize, or modify a collection of voice objects or messages. Human voice and other audio communication, recorded or otherwise, is serial in nature. That is, humans listen to voice communication as one serial stream of information. Recorded audio must be listened to serially in order to retrieve or identify its contents. This requirement makes it difficult to organize large amounts of recorded digitized voice information because the requirement to listen to each voice message serially makes browsing through the various voice messages tedious. However, text information is ideal for organizing voice messages because human sight can quickly scan lists of text annotations. Additionally, the text annotations can be used as keywords and indices for searching by database management software, making practical the management of large scale voice object storage.

As an example of this application of the invention, an interactive voice response system can be configured to collect market research data from telephone callers. Simply collecting these messages into a queue, as conventional voice messaging systems do, requires that the message contents be transcribed into text by a human in order to use the collected data. In addition to being labor intensive, this process removes all of the subjective information contained in the caller's voice message (i.e., anger, enthusiasm, etc.), which may be of great value. Using the present invention, it is possible to review the messages and annotate them with text for purposes of organization. The messages are retained in their original speech form complete with all subjective information. Full transcription is not required, but the messages can be quickly retrieved as voice by database software using the text annotations as keywords or indices or by visual scanning of the text annotations.

With the basic network interfacing capability available, a wide variety of improvements and modifications for particular applications can be implemented. For example, compound document modification control is typically provided, so that some readers may modify the basic compound document, while others may only make comments or only read the document without making any comments. A screening function permits particular parts of documents to be reviewed only by certain users. Document encryption is available in a variety of forms. Moreover, as new technologies such as automated speech recognition become commercially available, they can be integrated with the system so that the recorded oral comments can be transcribed automatically when desired.

Thus, the present invention provides an approach to recording, processing, storing, and playing back voice objects (having both voice and other audio information) through the audio communications network, in a manner that is fully integrated with compound documents managed on the digital communications network. This capability permits network users to improve their interactive oral/written communication. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a block diagram of the information flow during processing of voice commands.

DETAILED DESCRIPTION OF THE PREFERRED EMBODIMENT

Figure 1:
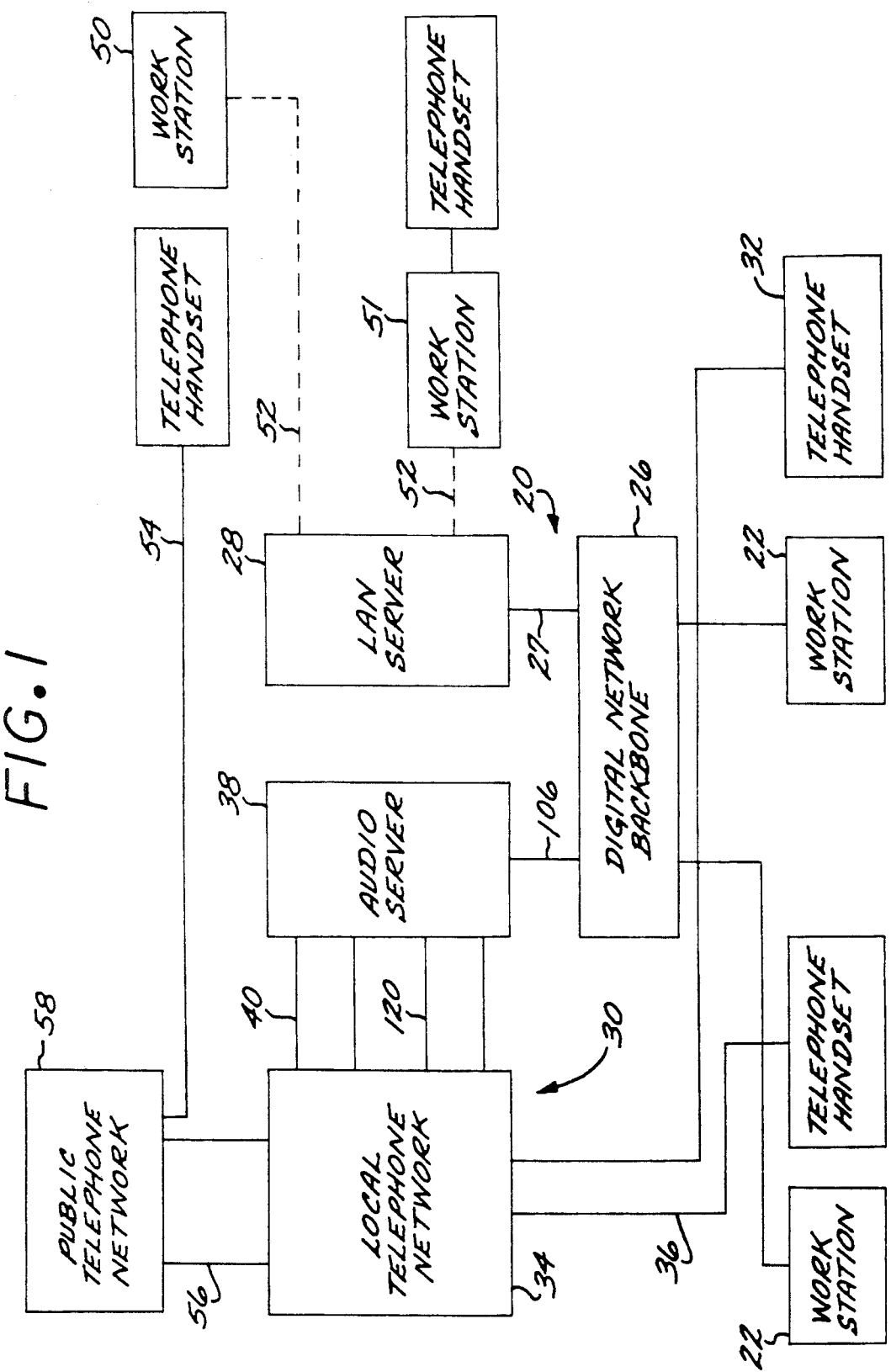
FIG. 1 is a pictorial representation of a communications system.

As illustrated in FIG. 1, two otherwise-independent networks are integrated by the present invention. A digital electronic network may be either a wide area network, a metropolitan area network, or a local area network (LAN), and is depicted here as a preferred LAN 20. The LAN 20 may communicate with other LANs, or with other digital networks. The LAN 20 includes one or more, and typically many more, work stations 22 that are located on user's desks. Each work station 22 typically has a keyboard and display with a hard wired digital communications line 24 to a digital network backbone 26. The work station 22 may also be a minicomputer and display that provides some remote, stand alone capability. The common digital network backbone 26 communicates through a digital communications line 27 with a digital network server, in this case a LAN server 28. The LAN server 28 includes a computer that receives digital signals from the work stations 22 over the path 24, 26, 27, does processing on the digital signals, and typically transmits new digital signals back to the same work station, or to other work stations. The LAN server 28 may also transmit digital signals to remote work stations 50 having telephone communications 54 directly to the public telephone network 58 and work stations 51 having digital telephone communications. These remote work stations 50, 51 are not hard wired to the digital network backbone 26, but instead are connected via a communication link 52 such as a modem or microwave link. The LAN 20 thus provides both central and auxiliary computing power for individual work stations, and also a means of communicating among the work stations.

LAN hardware such as central computing systems and electronic mail systems are available commercially. The description of the LAN network 20 is not meant to imply any particular system architecture, and in fact the present approach is compatible with any such architecture. For example, many current networks use cooperative processing client-server architectures, wherein tasks are shared throughout a network, and the present invention is fully operable in conjunction with such architecture.

Another type of network is an audio communications network, illustrated as a telephone network 30. The telephone network 30 includes handsets 32 at the desks of users, in this case adjacent their work stations 22. The handsets 32 convert acoustic audio information (audio information travelling through the air) to electronic analog audio information that is a representation of the acoustic audio information. (The term "analog" is used herein to indicate non-digitized information. Audio information can be in acoustic form heard by the human ear, but also in either digitized or analog representations of the acoustic audio information when processed within electronic systems.) The electronic analog audio information may be communicated through a telephone line 36 in a local telephone network 34 such as a PBX network, which in turn may be interconnected to a public telephone network 58 through lines 56. Such local and public telephone systems, in stand alone or interconnected form, are widely used throughout the United States and the world. The electronic audio information can be digitized at locations within the system, as for example within the handset (a digital telephone) or within the network 34. Other types of audio communications networks can be employed such as intercom systems, paging systems, or radio frequency communications devices. A key feature of the present invention is that it is operable with all such systems.

An audio server 38 is provided as a key component in the integration of the digital and audio communication networks. The audio server 38 is connected to the local telephone network 34 (or in its absence directly to the public telephone network 58) and thence into the telephone system 30 by analog communications lines 40 of any suitable form such as hardwired or microwave, and may be dedicated or multiplexed. The audio server 38 may also be connected to the telephone network 34 by by digital communications lines 120 of any suitable form such as Bellcore DS-0, DS-1, DS-3, or ISDN.

Figure 2:
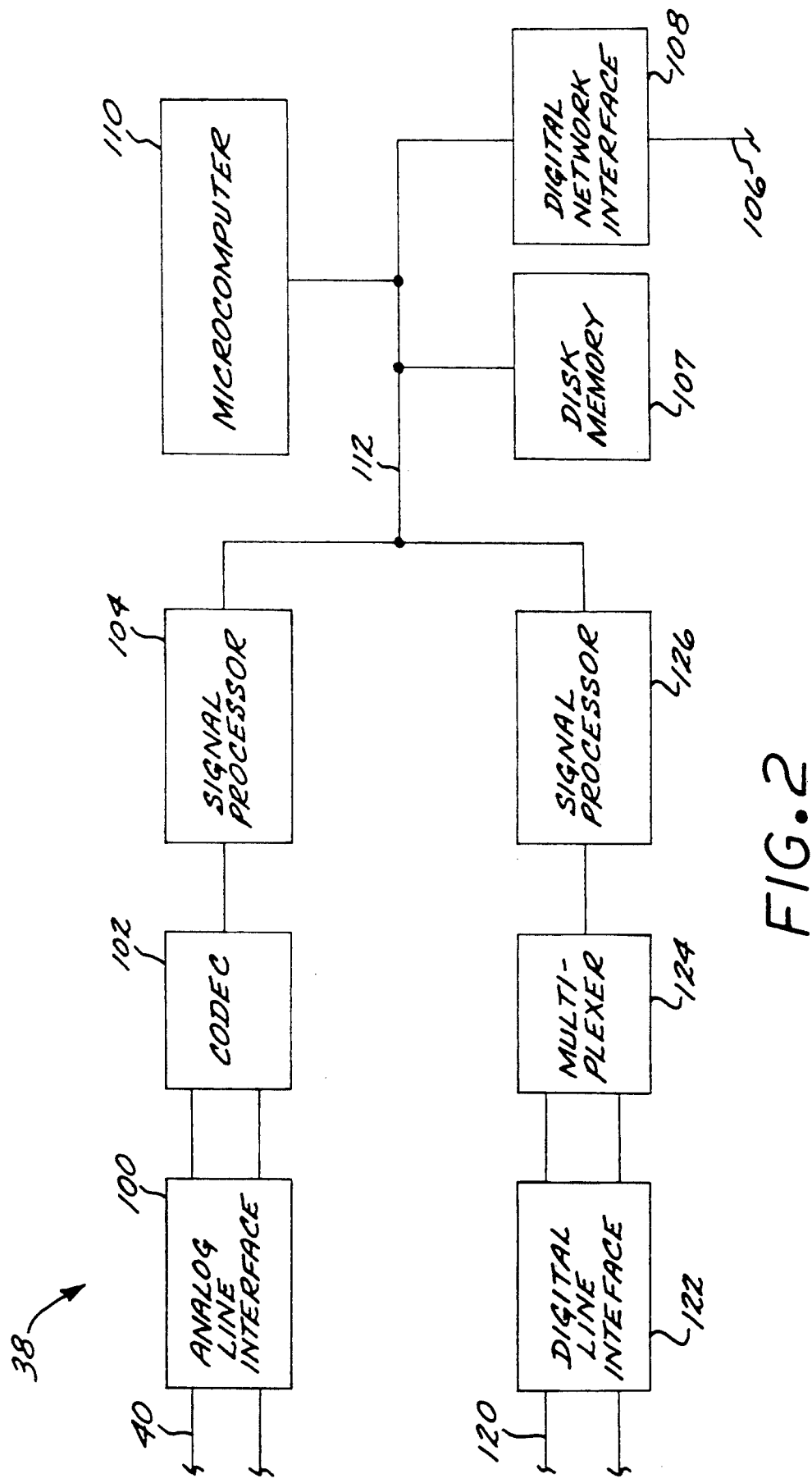
FIG. 2 is a schematic diagram of a audio server.

The audio server 38 is shown schematically in FIG. 2. Analog signals on lines 40 to or from the local telephone network 34 are sent or received through an analog line interface 100, comparable to that found in most telephone send/receive units. Analog telephone signals from the analog lines 40 are converted to digital signal representations of the audio signals by a codec (coder/decoder) 102 and sent to a signal processor 104. Outgoing signals are converted to analog form by the codec 102 for output to the analog lines 40.

Digital signals on lines 120 to or from the local telephone network 34 are sent or received through a digital line interface 122. Lines are selected by a multiplexer 124, and selected signals are passed through a signal processor 126.

The signal processors 104 and 126 use any of several known digital processing techniques, such as continuously variable delta modulation (CVDM), adaptive differential pulse code modulation (ADPCM), code excited linear prediction (CELP) or others that are known or may be discovered later, to compress the speech data arriving from the codec 102 or the multiplexer 124. The compressed digital data is typically transmitted across a microcomputer bus 112 by the signal processors 104 and 126 to a disk memory 107 for storage. During playback, the signal processors 104 and 126 receive compressed speech data from the disk memory 107, expand it to its original uncompressed form using the inverse form of the digital signal processing technique that compressed it, and send it to the codec 102 and analog interface 100 for output through the analog lines 40, or to the multiplexer 124 and digital line interface 122 for output through the digital lines 120.

A digital network interface 108 connects to a digital communications line 106 and provides a means of communicating with a variety of digital networks, both standard, such as IEEE 802.3, and non-standard, as well as both local area, such as IEEE 802.5, and wide-area, such as CCITT Recommendation X.25. The digital communications line 106 connects the audio server 38 to the digital network backbone 26 of the digital network 20. Information from the LAN 20 arrives on the communications line 106 as messages that are sent to a microcomputer 110 through the microcomputer bus 112.

The microcomputer 110 receives messages and controls the signal processor 104 and 126 and the disk memory 107 to accomplish the task requested by the message sent from the LAN 20. When the task is complete, the microcomputer 110 sends a return message back to the digital communication line 106 by means of the digital network interface 108. The microcomputer 110 can also control the transfer of digitized speech data, compressed or uncompressed, stored on the disk memory 107 to or from the digital communications network 20. By this approach, programmed instructions from work stations 22 can be used to control actions of the audio communications network 30, and vice versa.

In the preferred approach, the audio server 38 has been implemented using an AST Research Inc. Premium 386SX/16 Model 5V as the microcomputer 110 with a Western Digital Corporation Model 8003E thinwire ethernet adapter as the digital network interface 108. A Connor Peripherals 100-megabyte disk drive Model CT-3104 is used as the disk memory 107. The analog line interface 100, codec 102, and signal processor 104 were implemented using a Dialogic Corporation Model D/41B telephone interface. The digital line interface 122, multiplexer 124, and signal processor 126 are implemented using a Dialogic Corporation Model DTI/101 interface board combined with a Dialogic Corporation model D/120 signal processing board.

In the preferred approach, the present invention has been implemented with an ethernet LAN 20 utilizing a Novell Corporation Advanced netware Operating System software Release 3.0. The work stations 22 were implemented with an AST Research Premium 386SX/16 Model 5V with Western Digital Corporation Model 8003 thinwire ethernet adapters connecting to the digital communications line 24. The system utilized a local telephone network 34 that is a Harris Corporation Model D1200 PBX. The PBX was interconnected with standard twisted-pair wiring to Panasonic Model KX-T2135 telephones as the handsets 32. The PBX local telephone network 34 was connected to the available public switch telephone network 58. The analog lines 56 are conventional telephone lines installed by the telephone company to the PBX telephone network 34. No hardware or software modifications were made to the available work stations or telephone system as they were purchased commercially.

The hardware and operating system software discussed previously operate in conjunction with applications and system software. A convenient approach to the implementation of the present invention is to use commercially available applications software for the LAN 20 to the greatest extent possible. Since the preferred embodiment of the invention is directed toward an interactive network integration of audio information such as voice with text, data, and image, a commercially distributed database software product was selected. Lotus Notes ® software was purchased from Lotus Development Corporation, Cambridge, Mass., and loaded into the LAN server 28. Lotus Notes ® software provides basic creation, editing, distribution, and management features for the text, data, and image objects of compound documents, and is convenient for use at the networked work stations 22. Lotus Notes ® software was chosen for the preferred implementation because it operates with a LAN implementation of a digital communications network 20, is based on a client/server architecture enabling use of the audio server 38, supports the import and export of foreign objects (such as audio, in the case of the present invention) into the documents it manages, and supports security features of the present invention.

System software executing in the work stations 22 and the audio server 38 control the present invention to achieve the desired integration of the telephone network 30 and the LAN 20. The software is implemented using a client/server architecture with the work stations 22 (and 50, 51) acting as the client and the audio server 38 acting as the server. The work station client software provides a variety of functions to application software that also is executed on the work stations 22. The application software can be any software program that requires recording and playback of audio information and can be modified to use the functions of the client software.

Control of the present invention originates at the work stations 22 whenever the application software requires the services of the present invention. This usually occurs as the direct result of some command from the human system user. However, it could also be the result of some other process, manual or automatic.

The client software of the presently preferred embodiment provides seven functions to the application software: call phone, record voice object, play back voice object, delete voice object, store voice object, retrieve voice object, and hang up phone. The flow of control and data among the work stations 22, LAN 20, audio server 38, local telephone network 34, and telephone handset 32 is illustrated in FIG. 3 using labelled arrows called "paths" and is discussed in the following paragraphs.

The call phone function establishes an audio connection between the audio server 38 and the handset 32. When the application software executes the call phone function, the client software issues a call phone message that is sent across the LAN 20 to the audio server 38, path A. After receiving the message, the audio server 38 establishes the audio path to the telephone 32 by whatever means required by the local telephone network 34, path B. For analog circuits, this usually is accomplished by going off-hook, that is, establishing a nominal current flow in the analog lines 40 and issuing DTMF tones to dial the desired telephone handset causing the local telephone network 34 to issue ringing tones at the handset 32. For digital circuits, this is accomplished by changing the state of the signaling bits to indicate off-hook. When the user answers the handset 32, audio information, such as speaking the greeting "hello" or pressing any key on the telephone's DTMF keypad, is transmitted by the local telephone network 34 back to the audio server, path C. The audio server 38 interprets this as establishment of the connection and issues a confirmation message back to the client software by means of the LAN 20, path D. The client software notifies the application software that the call phone function has completed.

The record voice object function uses the audio connection between the audio server 38 and the handset 32 established by the call phone function to store the user's speech in compressed digitized form on the audio server 38. When the application software executes the record voice object function, the client software issues a record voice object message that is sent across the LAN 20 to the audio server 38, path A. After receiving the message, the audio server 38 delivers a tone or plays a prerecorded message, stored in compressed digitized form, to the user by means of the local telephone system 34 and handset 32 prompting the user to speak, path B. The user speaks the desired acoustic audio message which is transmitted back to the audio server 38 by means of the telephone 32 and local telephone system 34, path C, and the audio server 38 converts and stores the audio in compressed digitized form. Termination of the recording process is accomplished by the user pressing a key on the key pad of the handset 32 or the keyboard of the work station 22, by pausing the speech output for a predetermined time period, or by command from the work station 22. Upon termination, the audio server 38 issues a confirmation message, including the identification number of the recorded voice object, back to the client software by mean of the LAN 20, path D. The client software notifies the application software that the record voice object function has completed.

The application software can either leave the voice object on the audio server 38 for permanent storage or retrieve it for storage on the work station 22 or digital network server 28. The retrieve voice object function moves the compressed digitized voice object to the handset 32 in analog form. When the application software executes the retrieve voice object function, the client software issues a retrieve voice object message that is sent across the LAN 20 to the audio server 38, path A. After receiving the message, the audio server 38 retrieves the voice object using the voice object identification supplied in the message. The audio server 38 issues a message indicating that the voice object was successfully stored back to the client software by means of the LAN 20, path D. The client software notifies the application software that the store voice object function has completed, terminating the function.

The store voice object function moves the compressed digitized voice object to the audio server 38. When the application software executes the store voice object function, the client software issues a store voice object message that is sent across the LAN 20 to the audio server 38, path A. After receiving the message, the audio server 38 stores the voice object using the voice object identification supplied in the message. The audio server 38 issues a message indicating that the voice object was stored back to the client software across the LAN, path D. The client software notifies the application software that the store voice object function has been completed.

The playback voice object function uses the audio connection between the audio server 38 and the handset 32 established by the call phone function to deliver audio stored in compressed digitized form from the audio server 38 to the telephone 32 in acoustic audio form. When the application software executes the playback voice object function, the client software issues a playback voice object message that is sent across the LAN 20 to the audio server 38, path A. After receiving the message, the audio server 38 retrieves the desired voice object, using the voice object identification supplied in the message, converts it from compressed digitized form to analog form for analog signal lines 40 or digital form for digital signal lines 120, and delivers it to the user by means of the local telephone system 34 and the handset 32, path B. Upon completion of playback, the audio server 38 issues a confirmation message back to the client software by means of the LAN 20, path D. The client software notifies the application software that the playback voice object function is complete.

The delete voice object function deletes the compressed digitized voice object from the audio server 38. When the application software executes the delete voice object function, the client software issues a delete voice object message that is sent across the LAN 20 to the audio server 38, path A. After receiving the message, the audio server 38 deletes the voice object from the disk memory 107 using the voice object identification supplied in the message. The audio server 38 issues a message indication that the voice object was deleted back to the client software by means of the LAN 20, path D. The client software notifies the application software that the delete voice object function has been completed.

The hangup phone function terminates the audio connection between the audio server 38 and the handset 32. When the application software executes the hangup phone function, the client software issues a hangup phone message that is sent across the LAN 20 to the audio server 38, path A. After receiving the message, the audio server 38 terminates the audio path to the telephone handset 32 by whatever means required by the telephone system 34, path B. For analog circuits, this is usually accomplished by going on-hook, that is, terminating the nominal current flow in the analog lines 40. For digital circuits, this is accomplished by changing the state of the signaling bits to indicate on-hook. The audio server 38 issues a confirmation message back to the client software by means of the LAN 20, path D. The client software notifies the application software that the hangup phone function is complete.

The operation of the software has been described herein to show how a local work station 22 controls the audio server 38 and thence the communication of voice objects in the telephone network 30. The invention can be applied in a number of different ways. The remote work station 50 connected to the LAN 20 by means of a telecommunications circuit 52 to the LAN server 38 can perform the same functions as the local work station 22. The voice objects can be communicated using the public telephone network 58 using the same techniques described previously for the local telephone system 34. If a remote work station 51 has its own audio playback and record capability, the voice objects can be recorded and played back directly. In another application of the present invention, any computing device, such as the LAN server 28, connected to the LAN 20 can function as the client and utilize the audio server 38 to record and deliver audio information using the local telephone network 34.

The present invention maintains the security of the voice objects, both stored in the audio server 38 and the work station 22 and also in transit across the LAN 20 by preventing disclosure of the audio information to unauthorized parties, using any of a variety of techniques. One technique, referred to as public key cryptography, is described in U.S. Pat. No. 4,405,829, whose disclosure is incorporated by reference. With this technique, the voice objects are encrypted and decrypted by the audio server 38 and the work station 22 as required.

In the preferred embodiment of the invention, the software was written in the C language and compiled using the Microsoft Corporation C compiler version 6.

It will now be appreciated that the present invention provides an important advance in the art of communicating with a mixture of written and audible information. Although a particular embodiment of the invention has been described in detail for purposes of illustration, various modifications may be made without departing from the spirit and scope of the invention. Accordingly, the invention is not to be limited except as by the appended claims.

What is claimed is:
1. A communication system, comprising:
digital network means for communicating digital information throughout a digital network, the digital network means including at least one work station at which a human being can gain access to the digital network;

audio communications network means for communicating audio information throughout an audio communications network, the audio communications network means including at least one audio input-/output device at which a human being can provide acoustic audio information to, and receive acoustic audio information from, the audio communications network;

digital network server means within the digital network means for processing digital information in the digital network, the digital network server means being in communication with the at least one work station through the digital network and having digital data storage means therein for storing digital signals in the digital network server means;

audio communications network server means within the audio communications network means for processing an electronic representation of audio information in the audio communications network, the audio communications network server means being in communication with the audio input/output device through the audio communications network;

audio data storage means communicating with the audio input/output device for storing an electronic representation of audio information; and command means in the digital network server means for controllably commanding input/output operation of the audio communications network server means.

2. The communication system of claim 1, wherein the digital electronic network means includes a local area network.

3. The communication system of claim 1, wherein the digital electronic network means includes a wide area network.

4. The communication system of claim 1, wherein the audio communications network means includes a telephone system.

5. The communication system of claim 1, wherein the audio communications network server means includes a programmable digital computer.

6. The communication system of claim 1, wherein the audio data storage means is within the audio communications network means.

7. The communication system of claim 1, wherein the audio data storage means is within the digital network means.

8. The communication system of claim 1, wherein the command means includes an instruction set that commands operation of the audio communications network server means using instructions that are input at the work station of the digital network means.

9. The communications system of claim 1, having at least two work stations within the digital network means.

10. A communication system operable with digital network means for communicating digital information throughout a digital network, the digital network means including at least one work station at which a human being can gain access to the digital network; audio communications network means for communicating audio information throughout an audio communications network, the audio communications network means including a least one audio input/output device at which a human being can provide acoustic audio information to, and receive acoustic audio information from, the audio communications network; and digital network server means within the digital network means for processing digital information in the digital network, the digital network server means being in communication with the at least one work station through the digital network and having digital data storage means therein for storing digital signals in the digital network server means, the communication system comprising:

audio communications network server means within the audio communications network means for processing an electronic representation of audio information in the audio communications network, the audio communications network server means being in communication with the audio input/output device through the audio communications network;

audio data storage means communicating with the audio input/output device for storing an electronic representation of audio information; and command means in the digital network server means for controllably commanding input/output operation of the audio communications network server means.

11. A communication system, comprising:

a digital electronic network having at least one work station at which a human being can process information in the digital network;

an audio communications network including at least one audio input/output device at which a human being can provide acoustic audio information to, and receive acoustic audio information from, the audio communications network;

a digital network server in communication with the at least one work station through the digital network and having a digital network server memory therein;

an audio communications network server in communication with the at least one audio input/output device through the audio communications network, the audio communications network server including
  an audio communications network server memory that stores digitized audio information, and
  an audio communications network server instruction set operable from the digital network server that controllably stores audio communications network information in digital form within the audio communications network server memory and transmits stored information from the audio communications network server memory through the audio communications network; and a digital network server instruction set in the digital network server that operates the audio communications network server, the digital network server instruction set being operable by a user of the at least one work station.

12. The communication system of claim 11, wherein the digital electronic network and the digital network server are included in a local area network.

13. The communication system of claim 11, wherein the audio communications network includes a telephone system.

14. The communication system of claim 11, wherein the audio communications network server comprises a programmable digital computer that includes the audio communications network server memory and audio communications network server instruction set.

15. A communication system operable with a digital electronic network having at least one work station at which a human being can process information in the digital network and a digital network server in communication with the at least one work station through the digital network and having a digital network server memory therein, and a telephone system having at least one telephone therein, comprising:

a telephone system server in communication with the at least one telephone, the telephone system server including a telephone system server instruction set operable from the digital network server that controllably causes the server to store audio information received from the at least one telephone in digital form and to transmit previously stored audio information from the telephone system server to the at least one telephone; and a digital network server instruction set in the digital network server memory that causes the telephone system server to controllably store and transmit audio information, the digital network server instruction set being operable by a user of the at least one work station.

16. The communication system of claim 15, wherein the audio information is stored within the telephone system server in digital form.

17. The communication system of claim 15, wherein the audio information is stored within the digital network in digital form.

18. The communication system of claim 15, wherein the digital network server instruction set and the telephone network server instruction set together includes:

means for providing a compound document at the at least one work station;

means for modifying the compound document at the at least one work station, the means for modifying including means for indicating in the compound document the location of a voice insertion, means for providing such a voice insertion through the telephone network and storing the voice insertion; and means for reviewing the document at the at least one work station, the means for recalling including means for displaying the text portion of the document, and means for replaying the voice insertion through the telephone system at the location indicated in the document.

19. A process for communicating through a digital network having at least one work station at which a human being can process information in the digital network and a digital network server in communication with the at least one work station through the digital network and having a digital network server memory therein, and a telephone system having at least one telephone therein, comprising the steps of:

providing a telephone system server in communication with the at least one telephone, the telephone system server including a telephone system server in communication with the at least one telephone, the telephone system server including a telephone system server instruction set operable from the digital network server that controllably causes the telephone system server to store audio information received from the at least one telephone in digital form and to transmit previously stored audio information from the telephone system server to the at least one telephone;

providing a digital network server instruction set in the digital network server that operates the telephone system server instruction set, the digital network server instruction set being operable by a user of the at least one work station;

providing a document having text portions at the at least one work station; and modifying the document at the at least one work station, the step of modifying including the substeps of indicating in the document the location of a voice insertion, providing such a voice insertion through the telephone network and storing the voice insertion; and recalling the document at one of the work stations, the step of recalling including the substeps of displaying the text portions of the document, and replaying the voice insertion at the location indicated in the document.

* * * * *